United States Patent [19]
Waring-Brown

[11] Patent Number: 5,890,453
[45] Date of Patent: *Apr. 6, 1999

[54] APPARATUS FOR LIFTING AND TRANSPORTING LARGE ANIMALS

[76] Inventor: Michelle A. Waring-Brown, P.O. Box 552, Moss Beach, Calif. 94038

[*] Notice: The term of this patent shall not extend beyond the expiration date of Pat. No. 5,660,143.

[21] Appl. No.: 872,472

[22] Filed: Jun. 10, 1997

Related U.S. Application Data

[63] Continuation of Ser. No. 675,611, Jul. 3, 1996, Pat. No. 5,660,143.

[51] Int. Cl.$^6$ .................................................... A01K 29/00
[52] U.S. Cl. .............................................................. 119/400
[58] Field of Search ..................................... 119/400, 405, 119/403, 406, 407; 414/540, 548, 550

[56] References Cited

U.S. PATENT DOCUMENTS

| | | | |
|---|---|---|---|
| 96,722 | 11/1869 | Payne et al. | 119/403 |
| 4,090,472 | 5/1978 | York | 119/20 |
| 4,809,644 | 3/1989 | Wells, Jr. | 119/117 |
| 5,393,193 | 2/1995 | Dagg | 414/540 |
| 5,660,143 | 8/1997 | Waring-Brown | 119/400 |

*Primary Examiner*—Thomas Price
*Attorney, Agent, or Firm*—Burns, Doane, Swecker & Mathis, L.L.P.

[57] ABSTRACT

A mobile apparatus is provided that is capable of recovering, supporting and transporting sick or injured large animals in their natural upright position. The mobile apparatus having a telescoping boom associated with the support structure of the apparatus. The telescoping boom having a hoist associated therewith which is capable of lifting and holding a large animal in a vertical position.

4 Claims, 5 Drawing Sheets

APPARATUS FOR LIFTING AND TRANSPORTING LARGE ANIMALS

This application is a continuation, of application Ser. No. 08/675,611 filed Jul. 3, 1996 now U.S. Pat. No. 5,660,143.

BACKGROUND OF THE INVENTION

1. Field of the Invention

The present invention is directed to an apparatus for lifting and transporting large animals, especially useful for rescuing injured or sick animals for transportation to a veterinary facility.

2. Prior Art

A very limited number of wheeled apparatus exists for recovering and transporting injured or sick large animals, such as horses, cows, marine animals, etc. Typically, horses and cows are "put down" at the site of their injury or sickness before being transported to a location for destruction. In some situations, particularly for thoroughbred horses and prized bulls, the animal is placed in a sling and dragged onto a trailer for transport in a prostrate position. The prostrate position is harmful for the animals, particularly if the animal is suffering from a respiratory or intestinal problem.

In limited situations, such as with marine animals or horses injured in remote locations, a sling suspended from a helicopter is used to rescue and transport the animal. Helicopter rescues are extremely expensive and the noise of the helicopter is stressful for the animal. In various other situations, marine animals are lifted in a sling suspended from a crane and transferred to a tank on a separate vehicle for transportation. The transfer of the animal from the crane to the transporting vehicle is often times cumbersome, dangerous and time-consuming.

In view of the limitations of prior art devices, it would be highly desirable to have a vehicle capable of recovering and transporting a sick or injured large animal in a comfortable, cost-effective manner.

SUMMARY OF THE INVENTION

The purpose of the present invention is to provide a mobile apparatus capable of recovering, supporting and transporting sick or injured large animals in their natural upright position. To accomplish this purpose there is provided a wheeled apparatus having a telescoping boom associated with the support structure of the apparatus. The telescoping boom having a hoist associated therewith which is capable of lifting and holding a large animal in a vertical position.

In operation, the apparatus is driven or towed to the location of the injured or sick animal. The rear of the apparatus is rotated downward to be in close contact or in contact with the ground near the injured or sick animal. The boom having the hoist associated therewith is extended out the rear of the apparatus. A harness or sling is placed around the animal. The sling is attached to the hoist. The animal is then raised to a supported standing position, if the animal has some capability of supporting itself, or to a completely suspended position above the ground. The boom is then retracted into the apparatus until the animal is inside the apparatus and the rear of the apparatus is rotated back up to its previous position and secured such that the animal can then be transported to a veterinary facility.

In one aspect of the invention there is provided a wheeled apparatus for lifting and transporting large animals, comprising an elongated enclosure having a floor, a front end, a rear end, a first wall extending along a first side of the enclosure and a second wall extending along a second side of the enclosure, at least two wheels supporting the apparatus, a plurality of first supports extending from the floor along the first wall to a top wall, a plurality of second supports extending from the floor along the second wall to the top wall, a plurality of cross members extending across the top wall and between the plurality of first supports and the plurality of second supports, a plurality of third supports angling from the plurality of first supports to a center elongated member extending along the top wall, a plurality of fourth supports angling from the plurality of second supports to the center elongated member, a telescoping boom in the center elongated member, the telescoping boom being extendable beyond the rear end of the elongated enclosure, a hoist associated with the telescoping boom, a boom actuating mechanism, and a hoist operating mechanism.

In another aspect of the invention there is provided an apparatus for lifting and transporting objects, comprising an elongated support structure having a floor, a front end, and a rear end, a boom extendable from an upper portion of the elongated support structure, the boom being extendable beyond the rear end of the elongated support structure, a hoist associated with the extendable boom, a boom extending mechanism connected to the boom, and a hoist operating mechanism connected to the hoist.

In yet another aspect of the invention there is provided a method for lifting and transporting a large animal, comprising the steps of providing a wheeled apparatus having an elongated support structure, a laterally extendable boom attached to a top of the elongated support structure and a distal end of the laterally extendable boom being extendable beyond a rear end of the elongated support structure, and a hoist associated with the laterally extendable boom, positioning the rear end of the elongated support structure adjacent to the large animal, extending the distal end of the boom beyond the rear end of the elongated support structure, placing a sling around the large animal, raising the large animal in the sling with the hoist and retracting the distal end of the boom into the elongated support structure such that the large animal is located within the elongated support structure.

DESCRIPTION OF THE PREFERRED EMBODIMENTS

Figure 1:
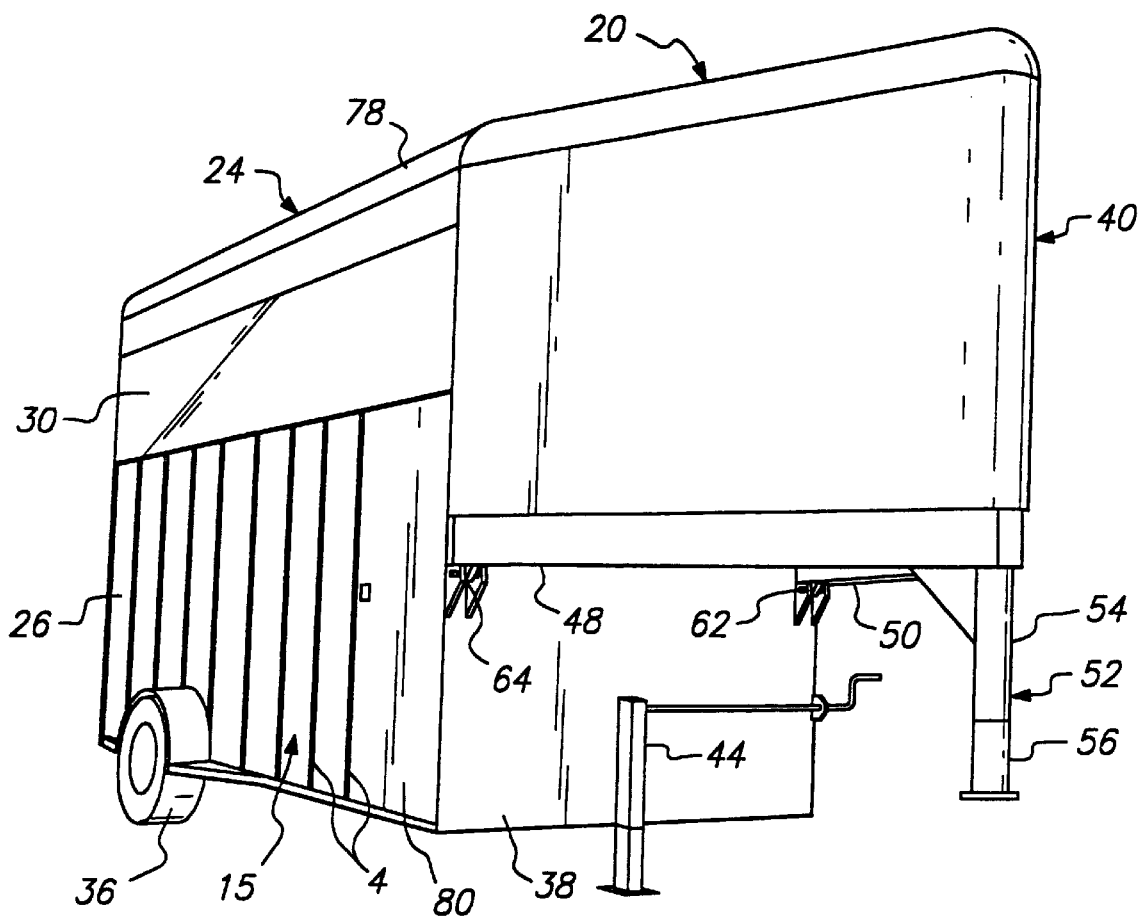
FIG. 1 is front left side perspective view of the apparatus of the present invention in accordance with one embodiment.

With continued reference to the drawing, in one embodiment of the invention a trailer 20 is provided for transporting a large, sick or injured animal (e.g., a horse, cow, marine animal, etc.). The trailer 20 includes a lifting system 22 (i.e., a traversing hoist system) that is extendable beyond the rear of the trailer for lifting the animal from the ground and moving a large animal into the trailer for transport to a veterinary facility or other desired location. Trailer 20 is towable behind a truck 46 or other towing vehicle. In another embodiment, the present invention is incorporated into a stand alone motorized vehicle such as a truck.

In one embodiment illustrated in the drawing, the trailer 20 includes an elongated enclosure 24 formed by floor 13, a pair of opposed side walls 15 and 17, and top wall 19. The trailer 20 is supported by at least two wheels 36. The floor 13 can optionally slope downward from the front of the trailer 20 toward the rear of the trailer. The elongated enclosure 24 is supported by a support structure comprised of a plurality of vertical support members 4 that extend upward from the floor 13 along each side wall 15 and 17, a plurality of short angled support members 2 which connect the plurality of vertical support members 4 to a plurality of cross members 1 which extend across the top of the trailer 20, and lateral supports 3 which connect each of the vertical support members 4 together along each side wall 15 and 17. In the lower portion of the trailer, side panels 26 and 28 are attached to the inside surface of the vertical support members 4 to form a smooth inside surface in the elongated enclosure so that an animal that becomes distressed or agitated while in the enclosure will not injure themselves or damage the vertical support members. Tie-downs (not shown) can be located on the floor 13 and the side panels 26 and 28 for securing the animal during transport. In one embodiment, a door 80 is provided near the front of the enclosure to allow additional access to the enclosure 24 and the extension compartment 40. In the upper portion of the trailer, window panels (preferably plastic) 30 and 32 are provided along the outside surface of the vertical support members 4 for providing illumination inside of the enclosure. Optionally, electrical lighting (not shown) powered by battery 34 (or by the vehicle being used to tow the trailer) can be provided along the sides and the top of the enclosure for providing additional illumination. The window panels 30 and 32 are protected from damage from inside the enclosure by lateral members 11. A roof panel 78 is provided across the outside of the cross members 1. Conventional signaling lights such as brake and turn lights (not shown) may also be provided and conventionally connected to the electrical system of the towing vehicle. It will also be appreciated by one of ordinary skill in the art that any or all of the panels can be eliminated or removed such that only the support structure forms the enclosure.

At the rear end of the enclosure 24, a pair of gates or doors (not shown) are provided which are hinged along the vertical edges of the opposing side walls 15 and 17. The pair of doors open outward and fold generally flat along the outside of the trailer. It will be appreciated that a single swinging door or a ramp could also be used. At the forward end of the enclosure 24, a front wall 38 extends up from the floor 13 between the opposing side walls 15 and 17. Attached to the front wall 38 is a conventional crank-operated screw jack or "landing gear" 44 for lifting and supporting the trailer when it is not attached to a truck or other towing vehicle 46. The screw jack can be used for elevating the front end of the trailer causing it to undergo a pivoting action about the axle through the wheels. This action causes the rear end of the trailer to be lowered toward the ground.

In front of and above front wall 38 is located an extension compartment 40 that serves as an extension of the enclosure 24. Compartment 40 is generally triangular in shape to produce a more aerodynamic shape, but it can be any of a variety of shapes such as but not limited to square or rounded. Compartment 40 houses battery 34, hydraulic pump 42 and any other items desired to be stored therein. Pivotally connected to the front of wall 38 are two support members 48 and 50 that extend forward from their respective pivoting connections 64 and 62 to an attachment member 52 (i.e., a suitable hitch or tongue) which is used for attaching the trailer 20 to the truck or towing vehicle 46. The configuration shown in the drawing is conventionally referred to as a "gooseneck" hitch. The attachment member 52 is comprised of an upper tubular portion which telescopically receives a lower tubular portion for varying the height of the attachment member. Attached to the lower tubular portion of the attachment member 52 is a socket coupling element for attaching to a ball hitch (not shown) on the towing vehicle.

Figure 4:
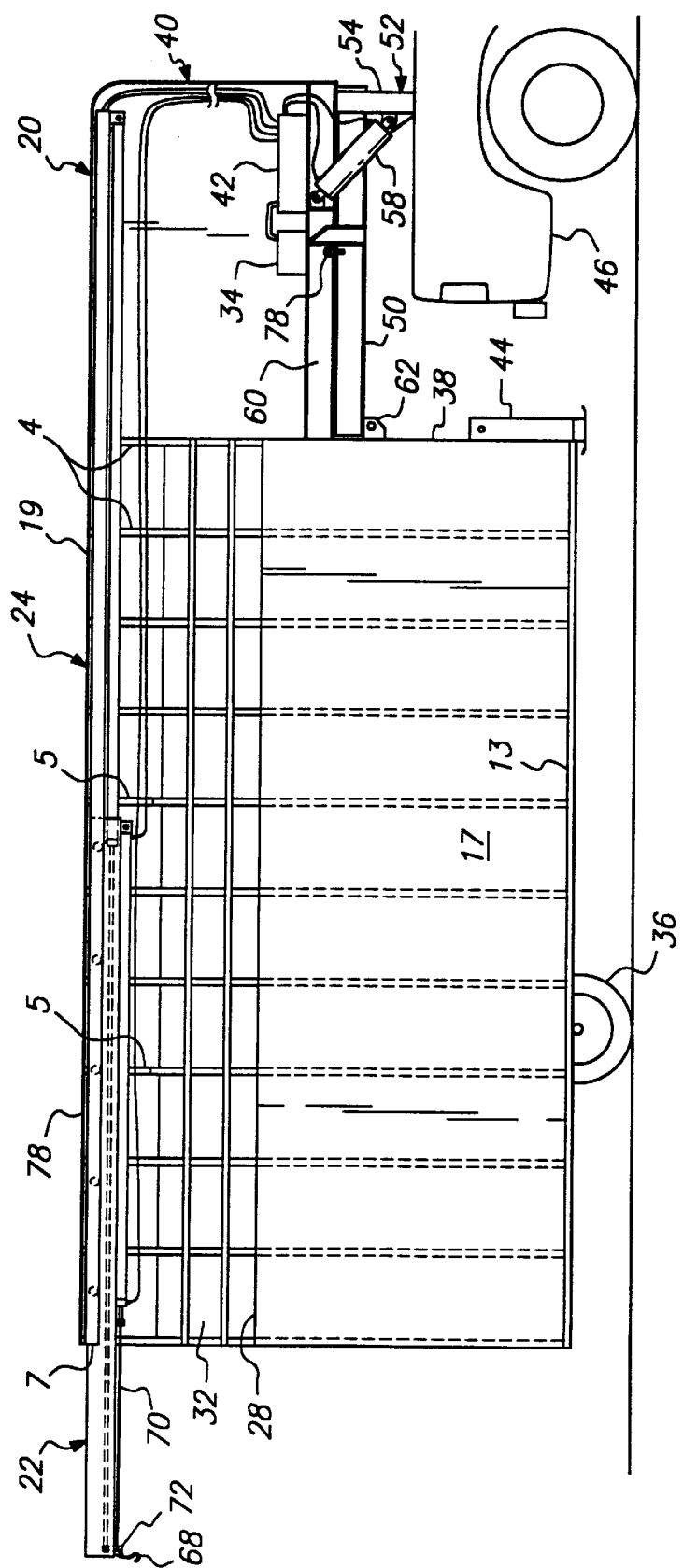
FIG. 4 is a lengthwise cross-sectional view of the apparatus of FIG. 1 attached to a truck with a boom extended out the rear of the apparatus.
Figure 5:
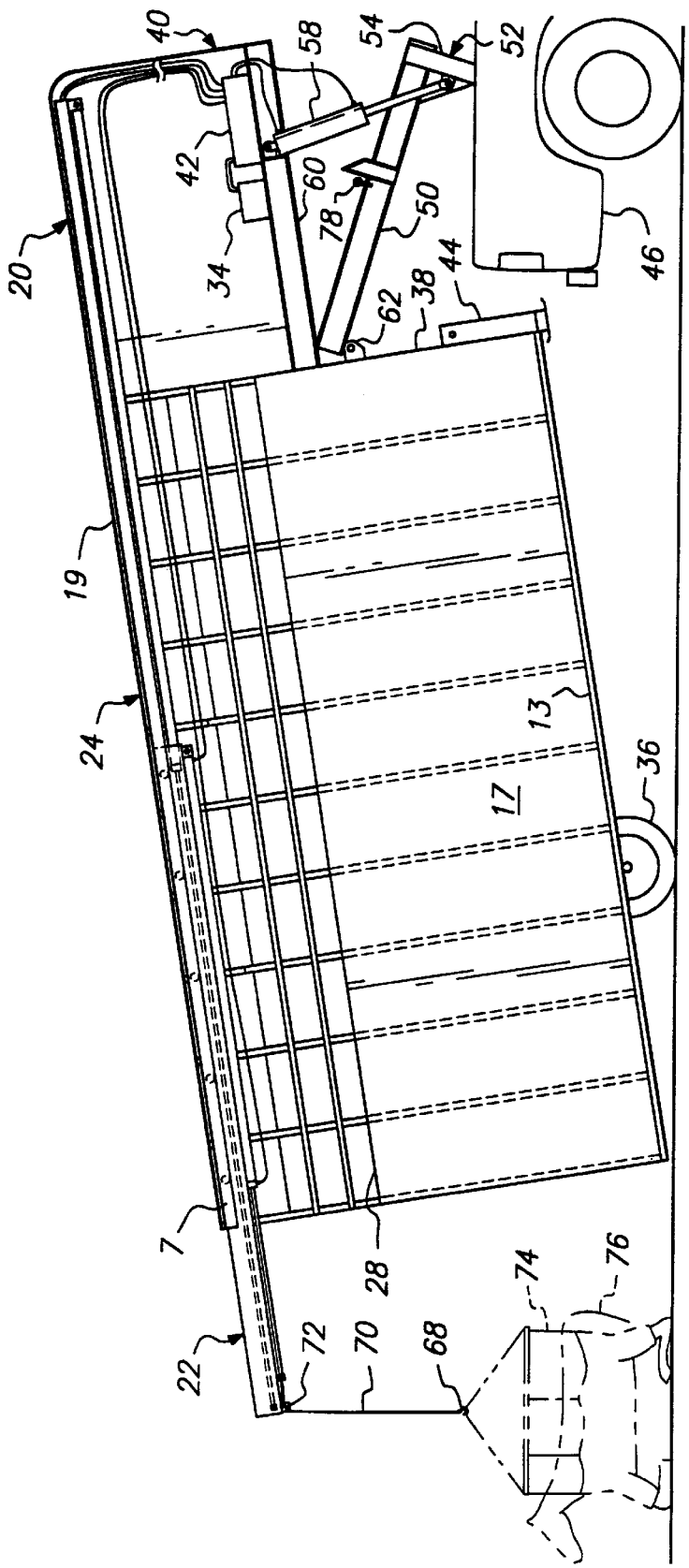
FIG. 5 is a lengthwise cross-sectional view of the apparatus of FIG. 4 rotated downward with an injured horse in a sling.

As best seen in FIGS. 1, 4 and 5, pivotally connected at one end to the upper tubular portion 54 is a telescoping or extendable member (e.g., a hydraulic piston and cylinder) 58. The telescoping member 58 is connected at the other end to support member 60 which is rigidly attached to the support structure of front wall 38 and supports the extension compartment 40. With this novel configuration, the telescoping member 58 which is powered by the battery 34 and hydraulic pump 42 can be used to elevate the front end of the trailer while the trailer is attached to the towing vehicle (as opposed to disconnecting the trailer and tipping it with the screw jack as discussed previously) causing the rear end of the trailer to be lowered toward the ground. In operation, as the telescoping member 58 is extended, attachment member 52 rotates forward about the ball hitch (not shown) in the towing vehicle; the support members 48 and 50 rotate clockwise around their respective pivotal connections 64 and 62; screw jack 44, wheels 36 and correspondingly the enclosure 24 are drawn forward (in one embodiment about six inches) toward the towing vehicle; the portion of the trailer in front of the wheels is raised up; and the portion of the trailer in back of the wheels is tipped down in contact with, or close to, the ground. The floor of the trailer can be tilted to an angle of about 10 degrees or less, preferably about 8 degrees, with respect to horizontal. This operation is advantageous for reasons to be discussed below with respect to loading the animal in the trailer. A locking mechanism 78 can be provided to secure support members 50 and 60 together during transport of the trailer 20.

Figure 2:
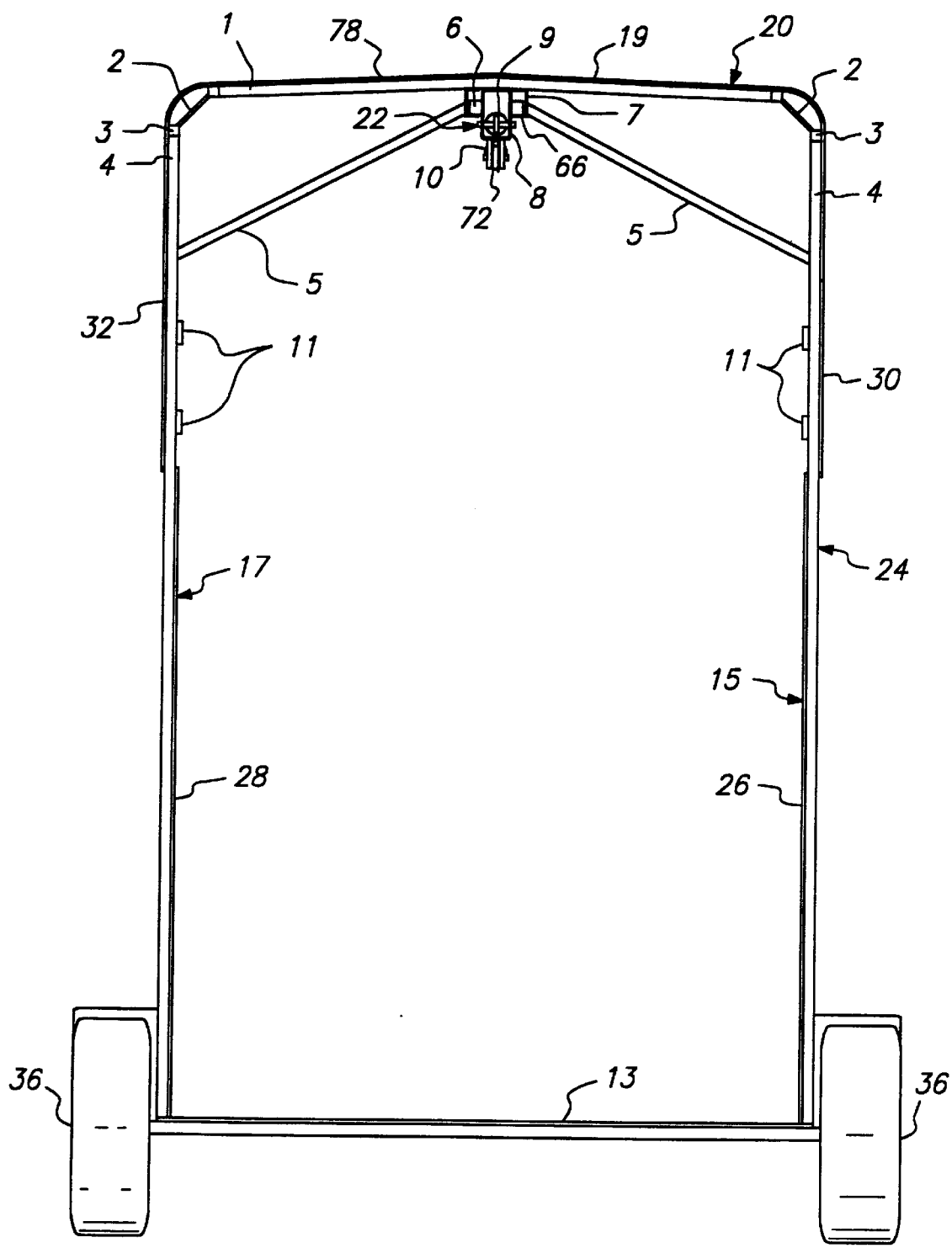
FIG. 2 is a cross-sectional view taken along line 2—2 of FIG. 1.
Figure 3:
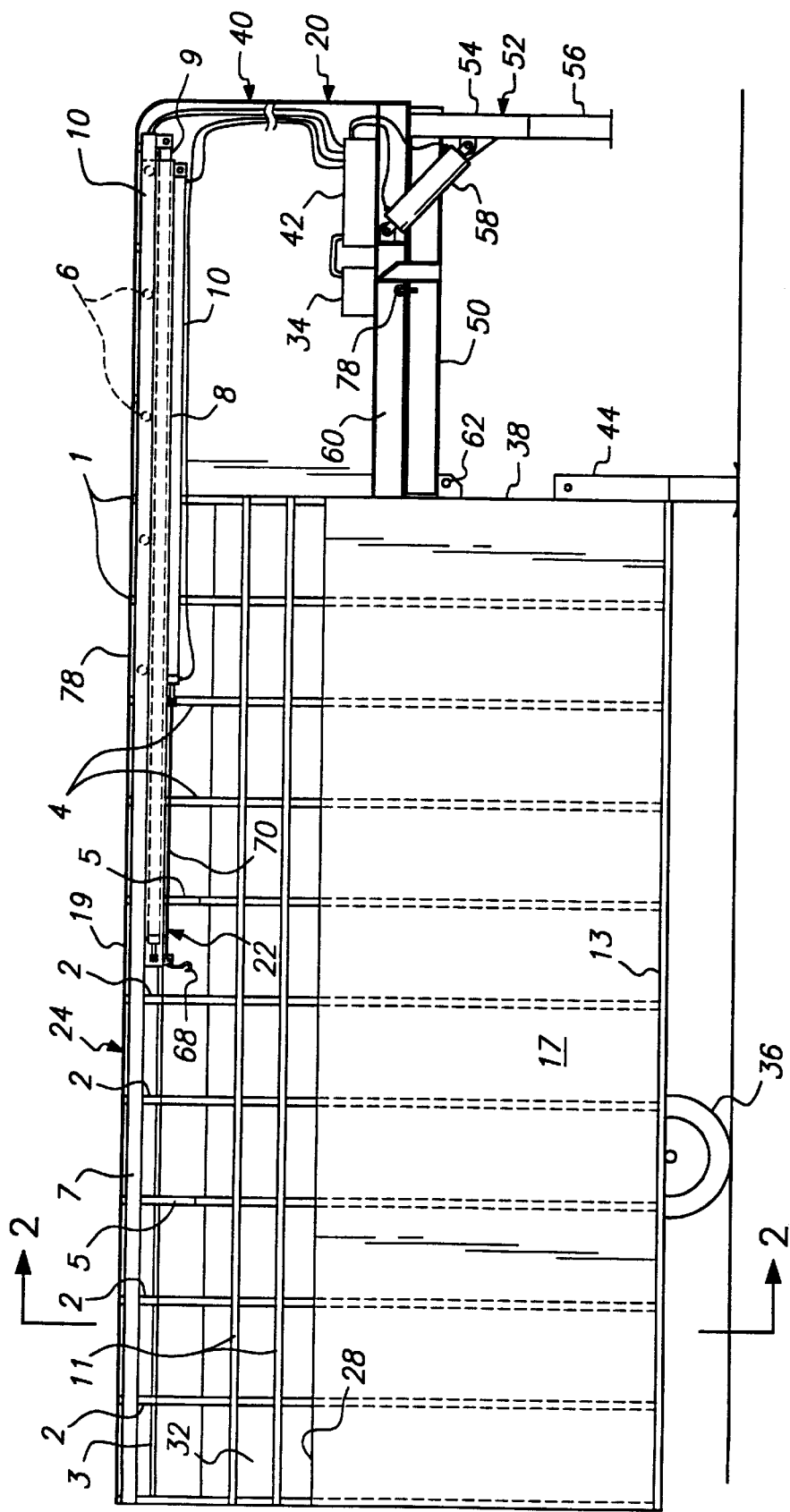
FIG. 3 is a lengthwise cross-sectional view of the apparatus of FIG. 1.

Associated with the top of the enclosure 24 and supported by the support structure is a lifting or traversing hoist system 22 that is extendable beyond the rear of the trailer for lifting and moving a large animal into the trailer for transport to a veterinary facility or other desired location. In one embodiment, the lifting or traversing hoist system 22 comprises a C-shaped channel member 7 attached to cross members 1 and extending generally the entire length of the enclosure 24 and the extension compartment 40. Channel member 7 is further supported by large angled supports 5 spaced periodically along the length of the enclosure 24. Angled supports 5 generally form an "A-frame" support with the vertical supports 4 as best seen in FIG. 2. Channel member 7 terminates at the rear of the trailer. Located in the opening of the channel 7 is a laterally extending member (e.g., a rectangular extrusion) or boom 8 which is generally speaking in this embodiment about half the length of the channel member 7. Boom 8 is movable in channel member 7 on rollers 6 which are supported by the lower portion 66 of the channel member 7. As will be appreciated by one of ordinary skill in the art, other systems can be for the channel member and rollers such as but not limited to a T-shaped extrusion or I-beam with rollers being supported on the flanged members of the extrusion or I-beam. In addition, the system can be located on the outside of the enclosure on the roof of the trailer.

In one embodiment, boom 8 is reciprocatably moved along channel member 7 by telescoping member (i.e., hydraulic piston and cylinder) 9. The cylinder of the telescoping member 9 is fixedly attached at the forward end of the trailer and extends inside of the boom 8 to near the distal end of the boom 8 where the piston is attached. In this way, the boom 8 is extendable beyond the end of the trailer 20 as shown in FIGS. 4 and 5 by extending the piston rearward in the trailer. Attached to the underside of the boom 8 is hoist 10. Hoist 10 is used to raise and lower hook 68 and correspondingly, a large animal and sling attached thereto as seen in FIG. 5. In one embodiment, hoist 10 uses telescoping member (i.e., hydraulic piston and cylinder) to raise and lower the hook. Hook 68 is attached to the piston of the telescoping member 10 by cable 70 which runs through pulley 72 at the distal end of the boom 8. It will be appreciated that other hoists can be used to raise and lower the hook 68 such as but not limited to a winch.

In one exemplary embodiment, the trailer 20 is 11 feet and 6 inches tall from the ground to the top of the roof. The elongated enclosure is 18 feet long from the rear of the trailer to the front wall 38 with an eight foot long extension compartment 40. The lifting system and support structure are capable of lifting a 3000 lbs. load from the ground behind the trailer and suspending that load above the floor of the trailer during transport.

The trailer 20 of the present invention is used to lift and transport injured or sick animals in a safe and cost-effective manner. For lifting and transporting an injured or sick animal, the rear of the trailer 20 is positioned adjacent to the animal. The rear of the trailer is tipped downward toward the ground using the telescoping member 58. Tipping the trailer downward into contact with the ground helps to stabilize the trailer by providing multiple points of contact (i.e., the rear of the trailer and the wheels) with the ground and by moving the center of gravity of the trailer aft. The tipped position helps to ensure that the animal's legs do not get caught underneath the trailer. It also positions the end of the boom 8 closer to the downed animal without having to extend the boom 8 farther out of the trailer. Then, the boom 8 is extended beyond the end of the trailer 20 using the telescoping member 9 until the distal end of the boom 8 is positioned over the animal 76. A sling 74 is placed around the animal 76. The hook 68 is then lowered from the distal end of the boom 8 using the hoist 10 and connected to the sling. The hoist 10 is then used to lift the animal to a supported standing position (if the animal can provide some support for itself) or to a position completely above the ground. The boom 8 is then retracted back into the trailer using the telescoping member 9 until the animal is just inside of the rear of the trailer. The trailer is tipped back forward to a level position, then the boom 8 is retracted further back into the trailer until the animal is in the desired position within the enclosure. The sling is then anchored to the enclosure to secure the animal for transport to a veterinary facility or other desired location. In one embodiment, after transport the trailer can be disconnected from the towing vehicle and left in place to be used as the veterinary facility. In another embodiment, the panels of the trailer are removable to provide better access to the enclosure such as for performing veterinary procedures on the animal in the trailer. It will also be appreciated that the above described steps can be varied in order, manner of performance, or some steps not performed at all and still be within the scope of the claimed invention.

Modifications and variations of the present invention will be apparent to those having ordinary skill in the art having read the above teachings, and the present invention is thus limited only be the spirit and scope of the following claims.

What is claimed is:

1. An apparatus for lifting and transporting objects, comprising:

an elongated support structure having a floor, a front end, and a rear end;

a boom extendable from an upper portion of the elongated support structure, the boom being extendable beyond the rear end of the elongated support structure;

a hoist associated with the extendable boom;

a boom extending mechanism connected to the boom; and a hoist operating mechanism connected to the hoist.

2. The apparatus of claim 1 further comprising:

means for rotating the rear end of the elongated support structure downward.

3. The apparatus of claim 1 further comprising:

a support member pivotally attached at a proximal end to the front end of the elongated support structure;

an attachment member connected to a distal end of the support member; and an extendable member attached at a first end to the attachment member and at a second end to a portion of the apparatus forward of the pivotal attachment of the support member.

4. The apparatus of claim 1 wherein the elongated support structure comprises:

a plurality of first supports extending from the floor along a first side of the elongated support structure;

a plurality of second supports extending from the floor along a second side of the elongated support structure;

a plurality of cross members extending between the plurality of first supports and the plurality of second supports;

a plurality of third supports angling from the plurality of first supports to a center elongated member extending transverse to the plurality of cross members, the boom being extendable from the center elongated member; and a plurality of fourth supports angling from the plurality of second supports to the center elongated member.

* * * * *